(12) United States Patent
Wang et al.

(10) Patent No.: US 11,002,953 B2
(45) Date of Patent: May 11, 2021

(54) MEMS-BASED SPATIAL LIGHT MODULATOR AND METHOD OF FORMING

(71) Applicant: The Regents of the University of California, Oakland, CA (US)

(72) Inventors: Youmin Wang, Berkeley, CA (US); Ming Chiang A Wu, Moraga, CA (US)

(73) Assignee: The Regents of the University of California, Oakland, CA (US)

( * ) Notice: Subject to any disclaimer, the term of this patent is extended or adjusted under 35 U.S.C. 154(b) by 152 days.

(21) Appl. No.: 16/309,354

(22) PCT Filed: Jun. 20, 2017

(86) PCT No.: PCT/US2017/038232
§ 371 (c)(1),
(2) Date: Dec. 12, 2018

(87) PCT Pub. No.: WO2018/075100
PCT Pub. Date: Apr. 26, 2018

(65) Prior Publication Data
US 2019/0310461 A1    Oct. 10, 2019

Related U.S. Application Data

(60) Provisional application No. 62/352,923, filed on Jun. 21, 2016.

(51) Int. Cl.
*G02B 26/08* (2006.01)
*G02B 26/10* (2006.01)
(Continued)

(52) U.S. Cl.
CPC ....... *G02B 26/0841* (2013.01); *G02B 26/085* (2013.01); *G02B 27/0087* (2013.01);
(Continued)

(58) Field of Classification Search
CPC ............. G02B 26/0841; G02B 26/085; G02B 26/105; G02B 26/101; G02B 26/0858;
(Continued)

(56) References Cited

U.S. PATENT DOCUMENTS

| 6,713,367 B2 | 3/2004 | Solgaard et al. |
| 8,670,172 B2* | 3/2014 | Stowe .................. H04N 1/1903 359/292 |

(Continued)

OTHER PUBLICATIONS

Uma Krishnamoorthy et al., "Self-Aligned Vertical Electrostatic Combdrives for Micromirror Actuation", "Journal of Microelectromechanical Systems", Aug. 1, 2003, DOI:10.1109/JMEMS.2003.811728, vol. 12, No. 4.
(Continued)

*Primary Examiner* — William R Alexander
*Assistant Examiner* — Tamara Y. Washington
(74) *Attorney, Agent, or Firm* — Kaplan Breyer Schwarz, LLP

(57) ABSTRACT

A spatial light modulator (SLM) is disclosed, wherein the SLM has a substrate comprising an array of MEMS-based mirror elements that is periodic with small pitch (<3 microns) and high fill factor (>80%) in a first dimension. Each mirror element includes a micromirror whose height above the substrate is controlled via a vertical comb-drive actuator, which is located completely beneath the micromirror in the first dimension. As a result, mirror element can control the phase of light reflected from its micromirror. In some embodiments, the SLM includes an array of mirror elements that is periodic with small pitch and high fill factor in two dimensions. In such embodiments, the actuator, as well as tethers for supporting the micromirror above the substrate, are located completely beneath the micromirror, thereby enabling high fill factor in both dimensions.

20 Claims, 11 Drawing Sheets

(51) Int. Cl.
*G02B 26/12* (2006.01)
*G02B 27/00* (2006.01)
*H04N 5/74* (2006.01)
*G09G 3/34* (2006.01)
*G03B 21/00* (2006.01)

(52) U.S. Cl.
CPC ............... *G09G 3/34* (2013.01); *H04N 5/74* (2013.01); *G03B 21/008* (2013.01); *G09G 3/346* (2013.01)

(58) Field of Classification Search
CPC ........... G02B 26/0816; G02B 26/0833; G02B 26/08; G02B 7/1821; G02B 7/182; B81B 2201/042; B81B 2201/033; B81B 2201/045; B81B 2203/058; B81B 2203/0109; B81B 2203/0163; B81B 2203/053; B81B 2203/0136; B81B 3/00; B81B 7/0006
USPC ..................................................... 359/221.2
See application file for complete search history.

(56) References Cited

U.S. PATENT DOCUMENTS

| | | | | |
|---|---|---|---|---|
| 8,767,185 B2* | 7/2014 | Sandstrom | .......... | G03F 7/70383 355/77 |
| 8,767,270 B2* | 7/2014 | Curry | ............. | H04N 1/047 358/474 |
| 8,791,972 B2* | 7/2014 | Hoover | .............. | G03G 15/0435 347/224 |
| 8,842,359 B1* | 9/2014 | Payne | ................ | G02B 26/0841 359/291 |
| 8,861,066 B2* | 10/2014 | Askebjer | ............ | G02B 26/0833 359/291 |
| 8,872,875 B2* | 10/2014 | Maeda | .................... | G02B 13/24 347/244 |
| 9,030,515 B2* | 5/2015 | Stowe | ...................... | B41J 2/447 347/239 |
| 9,164,373 B2* | 10/2015 | Sandstrom | ............ | G03F 9/7011 |
| 9,354,379 B2* | 5/2016 | Maeda | ................... | H01S 5/4025 |
| 9,459,540 B2* | 10/2016 | Sandstrom | .......... | G03F 7/70775 |
| 9,630,424 B2* | 4/2017 | Stowe | .................... | G02B 13/22 |
| 9,973,645 B2* | 5/2018 | Hunter | ............... | H04N 1/40037 |
| 2004/0184132 A1 | 9/2004 | Novotny et al. | | |
| 2009/0231671 A1 | 9/2009 | Yang et al. | | |
| 2010/0208329 A1 | 8/2010 | Sandstrom et al. | | |

OTHER PUBLICATIONS

Paul F. McManamon et al., "Optical Phased Array Technology", "Proceedings of the IEEE", Feb. 1, 1996, vol. 84, No. 2.

Jie Sun et al., "Two-dimensional apodized silicon photonic phased arrays", "Optics Letters", Jan. 15, 2014, Publisher: Optical Society of America, 367-370, vol. 39, No. 2, http://dx.doi.org/10.1364/OL.39.000367.

Jesse Levinson et al., "Toward Fully Autonomous Driving: Systems and Algorithms", 6 pp.

Byung-Wook Yoo et al., "Optical phased array using high contrast gratings for two dimensional beamforming and beamsteering", "Optics Express", May 20, 2013, Publisher: Optical Society of America, DOI:10.1364/OE.21.012238, 11 pp., vol. 21, No. 10.

Authorized Officer: Lee W. Young, International Search Report and Written Opinion issued in PCT patent application No. PCT/US2017/038232, Mar. 28, 2018, 7 pp.

* cited by examiner

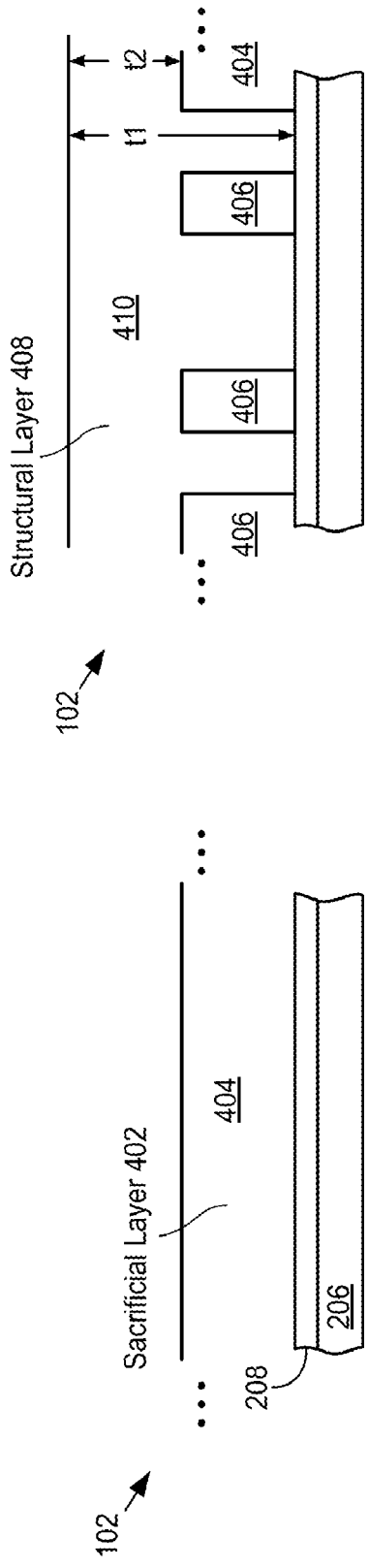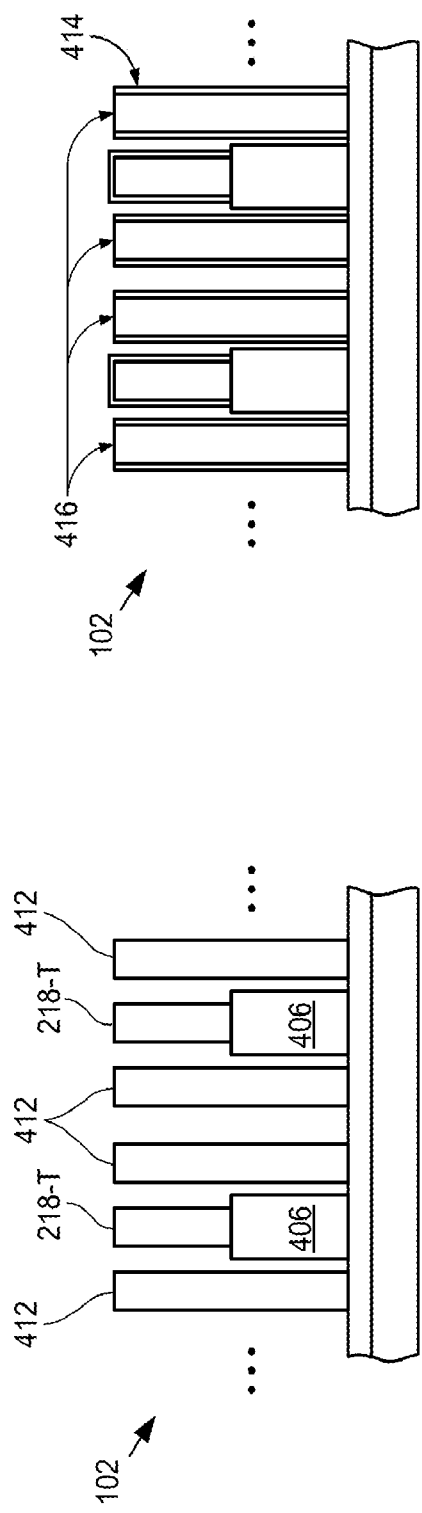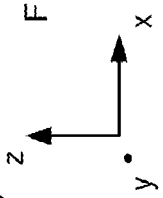
FIG. 4A
FIG. 4B
FIG. 4C
FIG. 4D

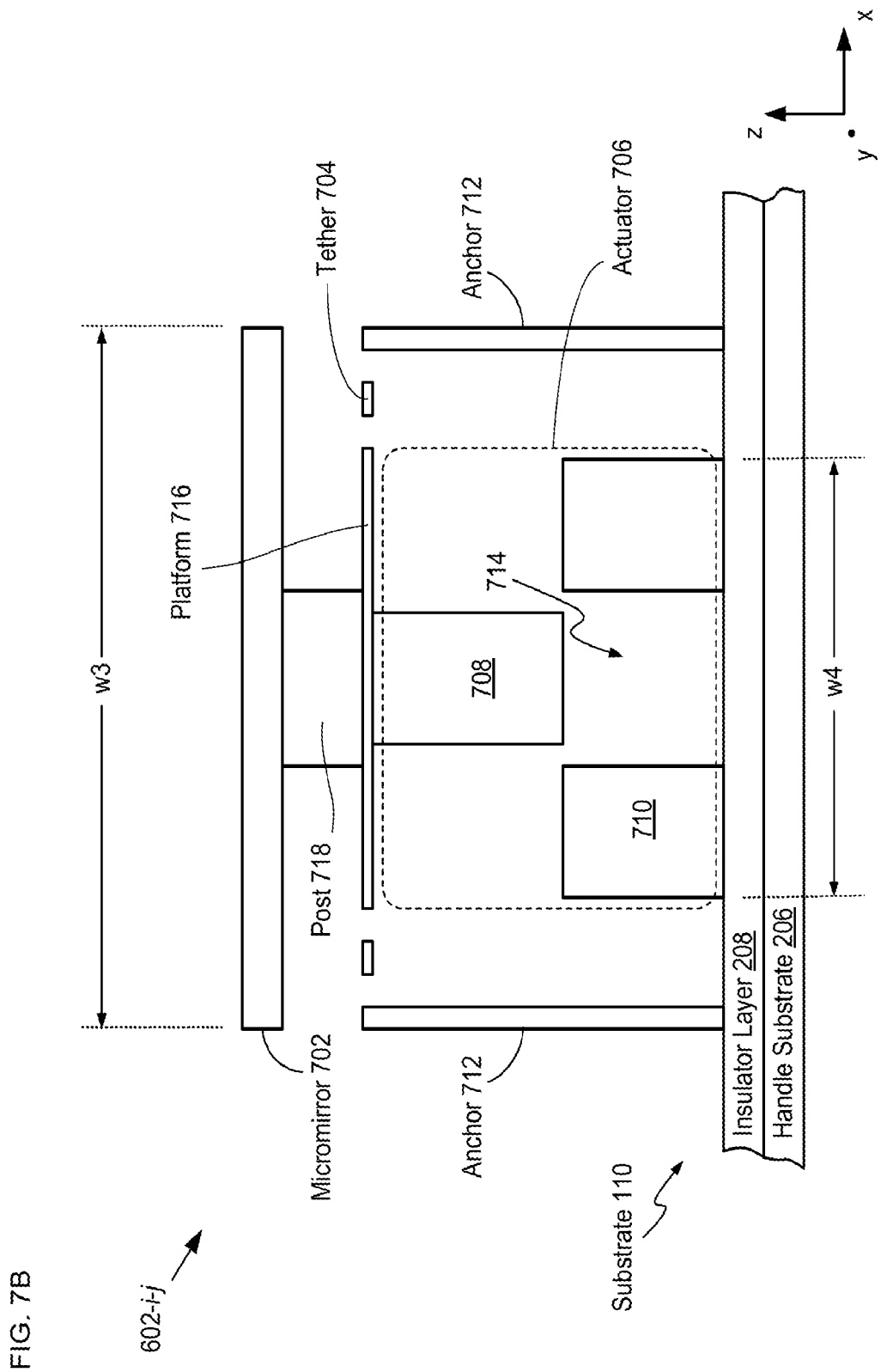

US 11,002,953 B2

MEMS-BASED SPATIAL LIGHT MODULATOR AND METHOD OF FORMING

STATEMENT REGARDING FEDERALLY-SPONSORED RESEARCH

This invention was made with government support under Grant Number HR0011-10-2-0002 awarded by the DARPA and Grant Number 0812072 awarded by NSF. The government has certain rights in the invention.

FIELD OF THE INVENTION

The present invention relates to free-space optics in general, and, more particularly, to optical phased arrays for free-space beam steering.

BACKGROUND OF THE INVENTION

The ability to steer a free-space optical beam in at least one direction is important in many applications, including Light Detection and Ranging (LIDAR), optical switching in telecom and datacom systems, adaptive optics, astronomy, dynamic illumination (e.g., dynamic headlights, etc.), medical diagnostics and imaging, and 3D printing. Historically, optical beam steering has been effected using macro-mechanical scanning elements, such as motorized mirrors, lenses, prisms, and the like. Unfortunately, such macro-mechanical elements are large, bulky, slow, and prone to failure.

More recently, solid-state approaches to beam steering have been developed, which offer significant improvements over their macro-mechanical counterparts. One of the most attractive solid-state beam steering elements is a spatial-light modulator (SLM) configured to operate as an Optical Phased Array (OPA). In addition to providing a more compact form factor, such devices offer additional capabilities, such as simultaneous scanning, pointing, and tracking of multiple objects.

Prior-art OPAs based on a variety of different types of phase modulators have been demonstrated. Perhaps the most ubiquitous are liquid crystal-based OPAs, often referred to as Liquid-Crystal-on-Silicon (LCOS). LCOS-based OPAs are widely used in optical switching equipment in the telecom and datacom industries, for example. Unfortunately, LCOS OPAs are disadvantaged in many applications due to their slow response times.

Silicon-photonics-waveguide-based OPAs having large scan angles have been demonstrated in the prior art as well; however, these devices have high insertion loss and are limited to infrared wavelength transparent to silicon.

Prior-art MEMS OPAs have shown faster response time than liquid crystal but, to date, their scan angles have been limited due to their relatively large mirror sizes (>20 μm).

The need for a high-speed, low-loss, large scan-angle OPA suitable for beam forming and steering remains, as yet, unmet in the prior art.

SUMMARY OF THE INVENTION

The present invention overcomes some of the costs and disadvantages of prior-art optical beam forming and steering elements. Embodiments of the present invention employ dense arrays of MEMS micromirrors that can be configured to impart a wide range of phase changes over the wavefront of input light to form and steer an output beam over wide scanning ranges. Embodiments of the present invention are particularly well suited for use in applications such as LIDAR, optical switching, adaptive optics, medical diagnostics and imaging, astronomy, 3D printing, and the like.

An illustrative embodiment of the present invention is an SLM comprising a substrate on which a plurality of MEMS-based mirror elements is arranged to define a one-dimensional OPA that is operative for forming a reflected optical beam from received input light and steering that optical beam over a large scanning range. The plurality of mirror elements is densely spaced in the array direction to enable a large field of view and scanning range in the scanning dimension.

Each mirror element includes a movable micromirror that is held above the substrate by a pair of flexible tethers that selectively enable vertical motion of the micromirror relative to the substrate. Each mirror element also includes an electrostatic vertical comb-drive actuator that is located beneath the micromirror for controlling the position of its micromirror above the substrate. As a result, each mirror element can control the phase of the portion of the wavefront of the input light it reflects such that the mirror elements, collectively, can impart a desired diffractive condition on the input light.

Because the actuators are located beneath the micromirrors, the large footprint normally associated with MEMS-based electrostatic actuators is avoided. As a result, the mirrors can be placed in extremely close proximity to one another such that the OPA has a high fill factor along the array dimension. Each actuator includes set of electrodes that includes (1) a single comb finger that is attached to the underside of the movable micromirror and (2) a pair of comb fingers that are fixedly attached to the substrate. The micromirrors and their respective comb fingers are held at the same voltage potential, typically ground, while the comb-finger pair is individually addressed with a control voltage suitable to move its respective micromirror to its desired position. In some embodiments, the comb fingers attached to the substrate are held at a fixed voltage while the comb fingers attached to the micromirrors are individually addressed. In some embodiments, the comb-finger pair is attached to the underside of the micromirror and the single comb finger is attached to the substrate.

In some embodiments, the SLM includes a plurality of mirror elements that are arranged in a two-dimensional array on the substrate to collectively define a two-dimensional OPA that is operative for steering a reflected beam over a large scanning range in each of two-dimensions. The plurality of mirror elements is densely spaced in the array direction to enable a large field of view and scanning range in the scanning dimension.

Each mirror element includes a micromirror that is part of a micromirror assembly held above the substrate by a set of tethers, as well as an electrostatic vertical comb-drive actuator that is located completely beneath the micromirror.

In some embodiments, the actuator of at least one mirror element includes a pencil-shaped electrode (i.e., a pencil comb finger) that is attached to the movable micromirror assembly and an annular comb wall that is fixedly attached to the substrate. The annular comb wall comprises a central region into which the pencil comb finger can be drawn when actuated. In some embodiments, the pencil comb finger is fixedly attached to the substrate and the annular comb wall is attached to the underside of the movable micromirror assembly.

An embodiment of the present invention is an apparatus comprising a spatial light modulator (102) that includes: a substrate (110); and a plurality of mirror elements (108)

disposed on the substrate, wherein each mirror element of the plurality thereof comprises: a micromirror (112) having a first surface (222) that is reflective for input light (116); and an actuator (114) that is operative for controlling the height (h1) of the first surface above the substrate; wherein the plurality of mirror elements are arranged in a first arrangement that is periodic in a first dimension with a first pitch (p1) that is less than or equal to 3 microns.

Another embodiment of the present invention is a method for forming a spatial light modulator (102), the method comprising: forming a plurality of actuators (114) on a substrate (110), each actuator having a first width (w2) in a first dimension; and forming a plurality of micromirrors (112), each micromirror having a first surface (222) and a second width (w1) in the first dimension, wherein the plurality of micromirrors is formed such each first surface is movable relative to the substrate, and wherein the plurality of micromirrors are arranged in a first arrangement that is periodic in the first dimension with a first period (p1) that is less than or equal to 3 microns; wherein each of the plurality of actuators is operatively coupled with a different micromirror of the plurality thereof such that the actuator is operative for controlling the height (h1) of its respective first surface above the substrate based on a control signal (106); and wherein the second width is equal to or greater than the first width and each actuator of the plurality thereof resides completely beneath its respective micromirror in the first dimension.

BRIEF DESCRIPTION OF THE DRAWINGS

FIGS. 4A-H depict cross-sectional views of a portion of SLM 102 at different stages in its fabrication.

FIGS. 7A-B depict schematic drawings of perspective and cross-section views of a mirror element in accordance with a first alternative embodiment of the present invention.

DETAILED DESCRIPTION

Figures 1A, 1B:
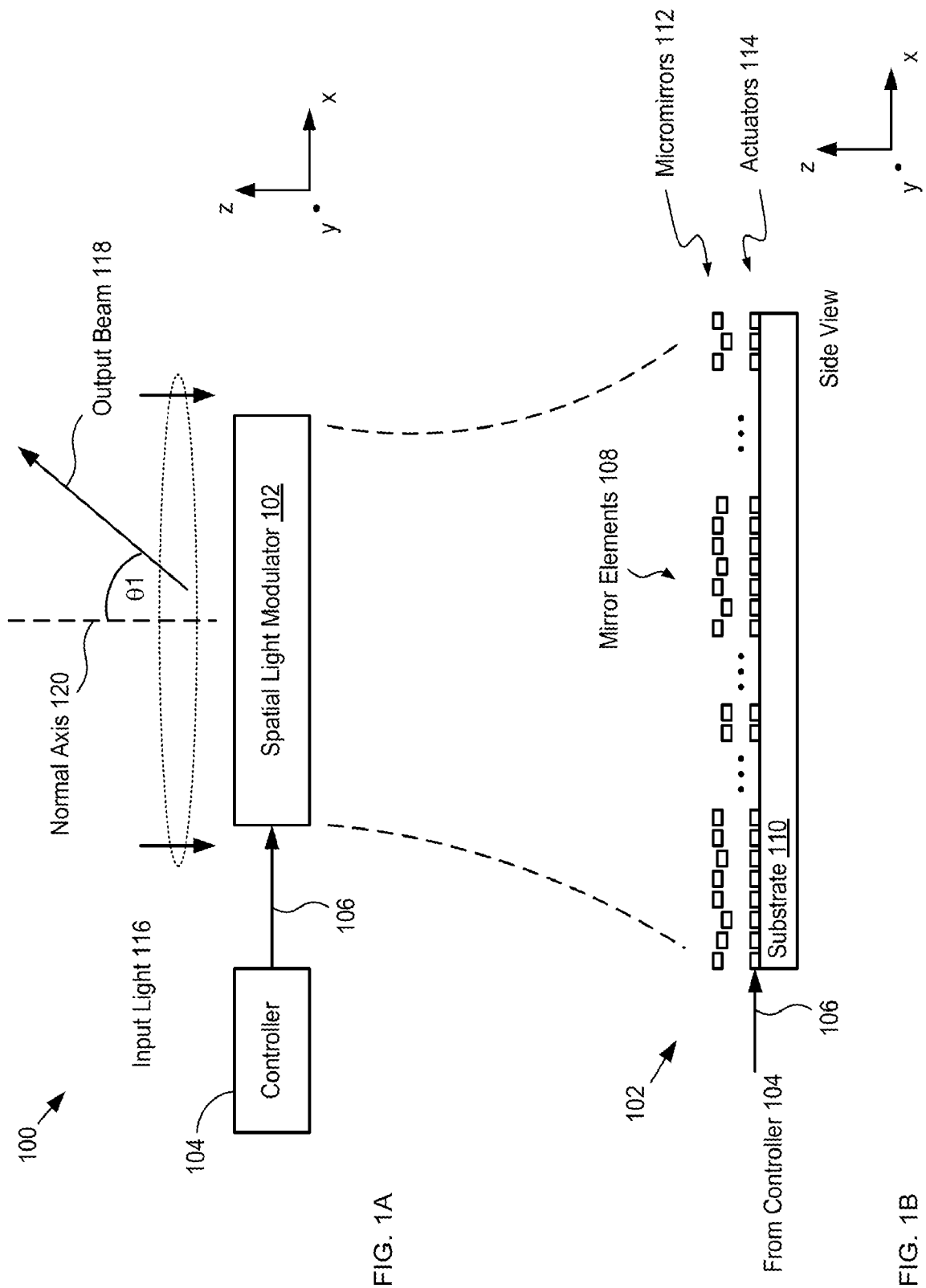
FIG. 1A depicts a schematic drawing of a beam scanning system in accordance with an illustrative embodiment of the present invention.
FIG. 1B depicts a schematic drawing of an enlarged representational view of a cross-section of SLM 102 in an operational state.

FIG. 1A depicts a schematic drawing of a beam scanning system in accordance with an illustrative embodiment of the present invention. System 100 includes spatial light modulator (SLM) 102 and controller 104. System 100 is operative for reflecting input light as an output beam and controlling the direction in which that output beam propagates. In the illustrative embodiment, system 100 controls the propagation direction of an output beam in one dimension over a wide range of angles within the x-z plane. In some embodiments, system 100 is operative for controlling the propagation direction of its output beam in two-dimensions.

FIG. 1B depicts a schematic drawing of an enlarged representational view of a cross-section of SLM 102 in an operational state. SLM 102 includes a plurality of mirror elements 108 arranged in a one-dimensional array on substrate 110. In the depicted example, the mirror elements are shown at different positions in the z-direction to effect manipulation of the relative phase of the wavefront of input light 116 along the x-direction.

Each mirror element 108 includes a movable micromirror 112 and an associated actuator 114, which controls the height of its respective micromirror above the substrate (i.e., its position in the z-direction). Each actuator 116 receives an independent control voltage as part of control signal 106, which is provide to SLM 102 by conventional instrument controller 104. In response to control signal 106, SLM 102 imparts the required phase configuration on input light 116 to give rise to output beam 108.

Figure 2A:
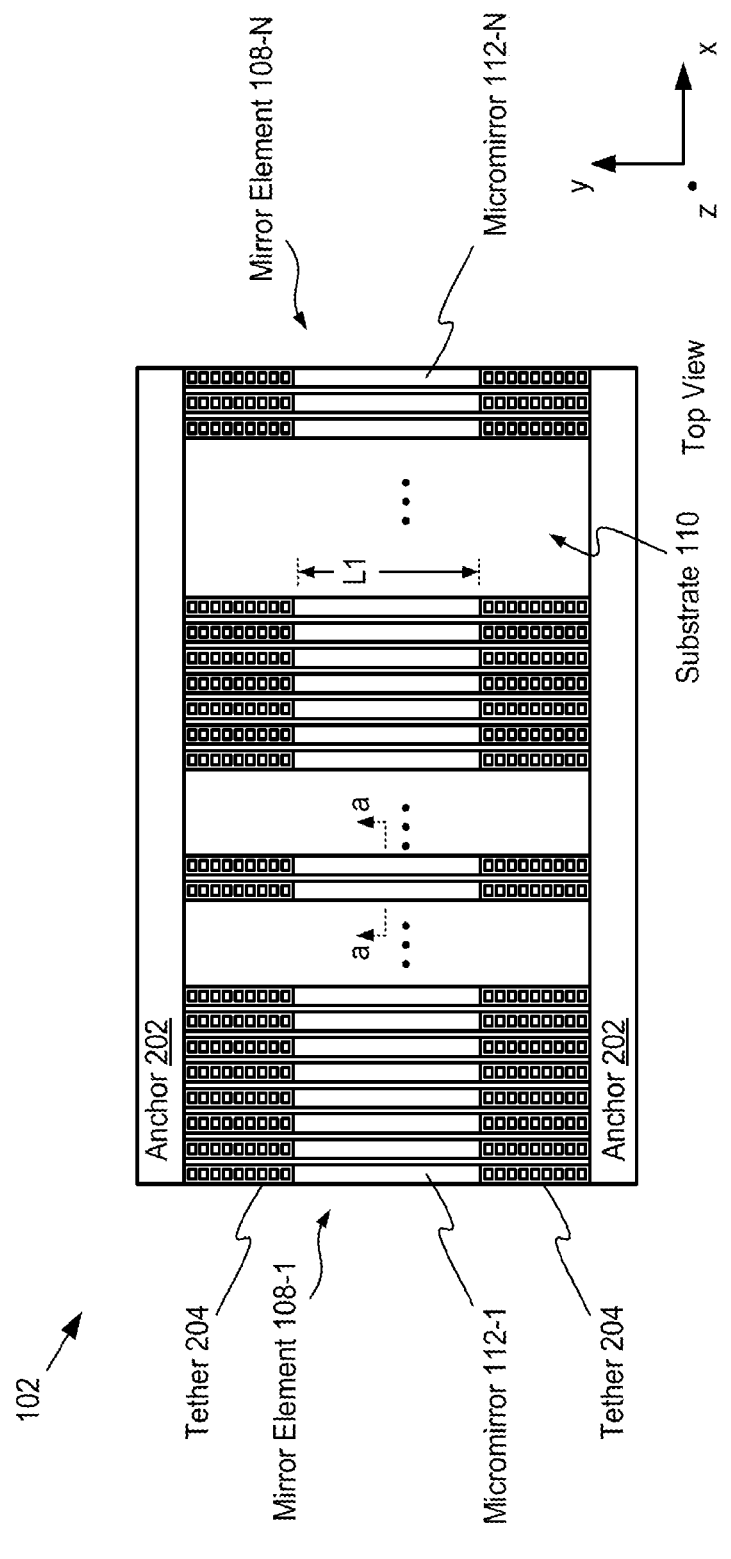
FIGS. 2A-B depict schematic drawings of top and cross-section views of SLM 102.
Figure 2B:
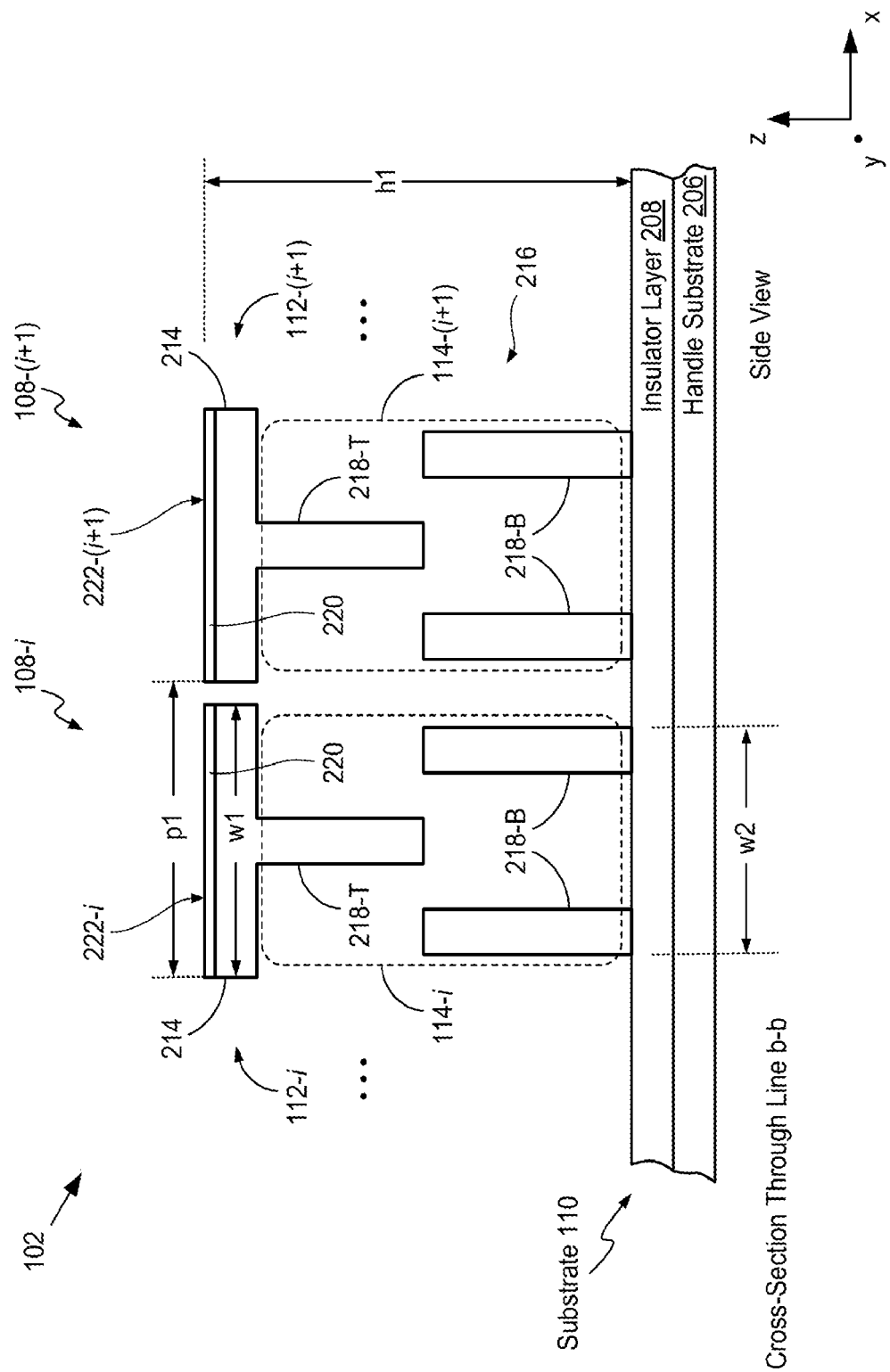

FIGS. 2A-B depict schematic drawings of top and cross-section views of SLM 102. SLM 102 includes mirror elements 108-1 through 108-N, which are linearly arrayed along the x-direction on substrate 110. For clarity, actuators 114-1 through 114-N are not shown in FIG. 2A. The cross-section shown in FIG. 2B is taken through line a-a of FIG. 2A and depicts a cross-section through one pair of adjacent mirror elements, mirror elements 108-$i$ and 108-($i$+1), where $i$=1 through N−1. In the depicted example, N=1000; however, N can have any practical value without departing from the scope of the present invention. Each of mirror elements 108 includes micromirror 112, actuator 114, and tethers 204, which extend between micromirror 112 and anchors 202 to hold the micromirror above substrate 110.

Anchors 202 are regions of structural material that are substantially immovable relative to substrate 110.

Tethers 204 are conventional "spring-like" structures that are dimensioned and arranged to facilitate motion of micromirrors 112-1 through 112-N (referred to, collectively, as micromirrors 112) relative to substrate 110 along the z-direction. In the depicted example, tethers 204 are simple straight beams that include arrays of openings along their length to make them more compliant in the z-direction, thereby facilitating out-of-plane motion of micromirrors 112. However, one skilled in the art will recognize, after reading this Specification, that tethers 204 can have any suitable shape, such as serpentine springs, folded-beam springs, etc., without departing from the scope of the present invention.

Each of micromirrors 112 includes plate 214 and reflector 220, which is optionally included in each micromirror to improve the reflectivity of its top surface 222 for input light 116. It should be noted that, in embodiments wherein reflector 220 is not included, top surface 222 is simply the top surface of plate 214.

Each micromirror is physically connected with actuator 114, which is a vertical comb-drive actuator operative for pulling the micromirror toward substrate 110, thereby changing the phase of the portion of the wavefront of input light 116 it reflects.

Actuator 114 includes a plurality of electrodes 216 that includes comb fingers 218-T and 218-B. Comb finger 218-T is attached to micromirror 112, while comb fingers 218-B are attached to substrate 110. In the depicted example, comb fingers 218-T and 218-B collectively define a "T configuration." in some embodiments, the arrangement of electrodes 216 in actuator 114 is reversed such that two comb fingers 218-T are attached to micromirror 112 and one comb fiber 218-B is attached to substrate 110, thereby defining a "Pi configuration." it should be noted that the number of electrodes 216 employed in actuator 114 is limited only by the resolution of the fabrication technology used to produce SLM 102.

When a voltage is applied between comb finger 218-T and comb fingers 218-B (as part of control signal 106), an electrostatic force develops that attracts comb finger 218-T into the space between comb fingers 218-B. As a result, micromirror 112 is drawn downward toward substrate 110, reducing the height, h1, of surface 222 of micromirror 112 above substrate 110.

It is an aspect of the present invention that an OPA having high fill factor (the ratio of mirror size to pitch) and extremely small pitch, p1, affords advantages that, heretofore, have been unattainable using prior-art approaches. Specifically, an OPA having a pitch of less than 3 microns in at least one dimension enables beamforming and beam steering with a very high FOV and, therefore, a large scanning range. Furthermore, the use of MEMS-based mirror elements enables extremely fast response times, thereby providing fast scan rates. One skilled in the art will recognize, after reading this Specification, that the performance of a spatial-light modulator in accordance with the present invention is determined by pitch, p1, aperture, and the number of elements, N, in the array of mirror elements. The ranging distance of such an OPA is proportional to the square of its aperture size, its field of view (FOV) is inversely proportional to p1 (according to the formula: $FOV=\sin^{-1}(\lambda/p1)$), and the number of resolvable spots is approximately equal to N.

In the depicted example, each micromirror 112 of SLM 102 has a plate length, L1, of approximately 35 mm, and a width, w1, of approximately 2.1 micron. Mirror elements 108 are arrayed along the x-direction with a pitch, p1, of 2.4 micron. As a result, the SLM has a 100 meter ranging distance, a 22° scan angle (i.e., 2*θ1) at 905 nm, and 256 resolvable spots in the far field. It should be noted that larger scan angles can be attained at longer wavelengths. For example, the same SLM design achieves a scan angle of approximately 400 for a wavelength of 1550 nm.

It should be further noted that the dimensions and/or performance provided here for SLM 102 are merely exemplary and that myriad alternative designs for the SLM and/or its constituent mirror elements are within the scope of the present invention.

Figure 3:
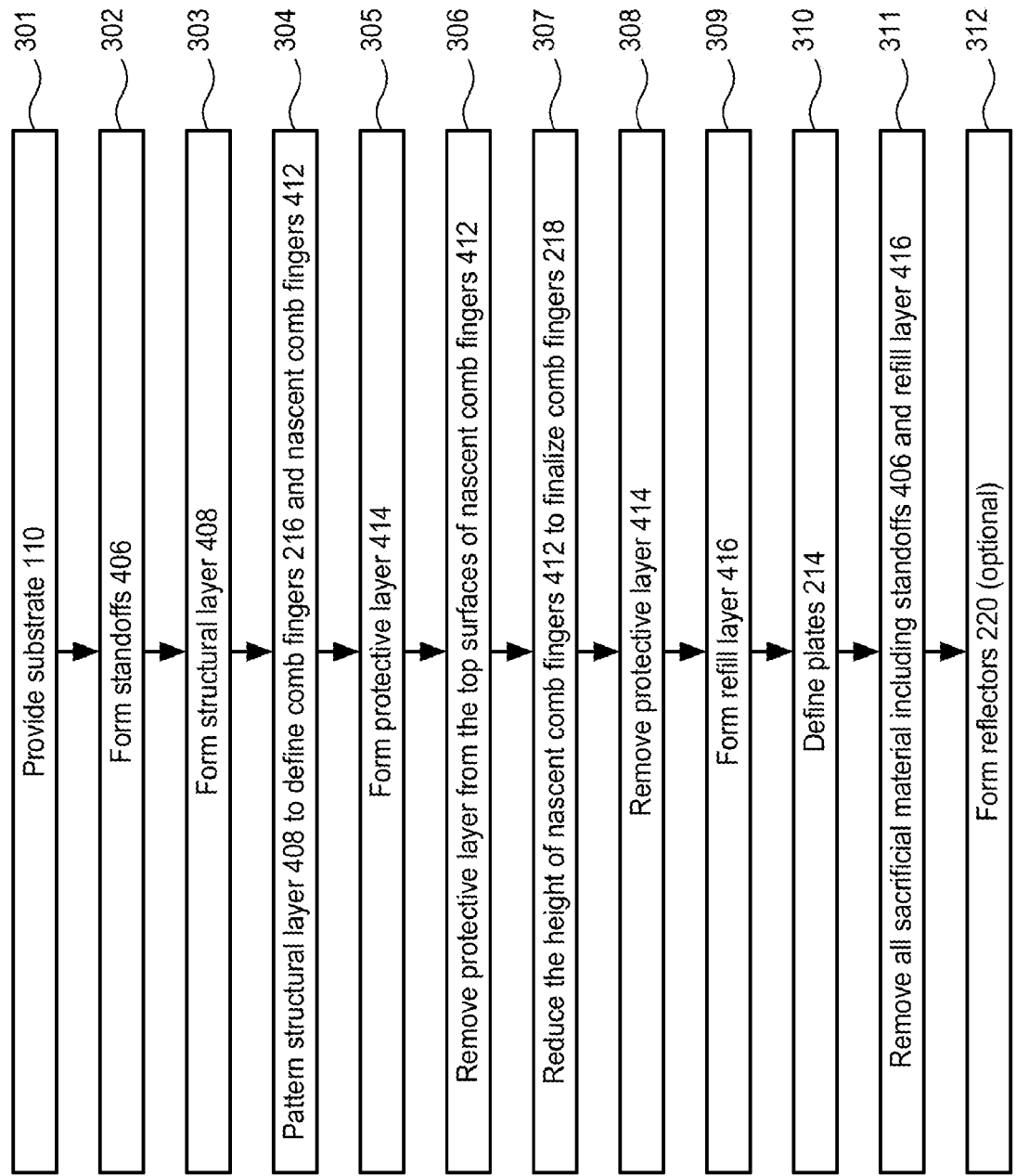
FIG. 3 depicts operations of a method suitable for forming an SLM in accordance with the illustrative embodiment of the present invention.

FIG. 3 depicts operations of a method suitable for forming an SLM in accordance with the illustrative embodiment of the present invention. Method 300 begins with operation 301, wherein substrate 110 is provided.

FIGS. 4A-H depict cross-sectional views of a portion of SLM 102 at different stages in its fabrication. Method 300 is described herein with continuing reference to FIGS. 1 and 2, as well as reference to FIGS. 4A-H.

Substrate 110 includes handle substrate 206 and insulator layer 208. In the depicted example, handle substrate 206 is a conventional silicon wafer and insulator layer 208 is a layer of stoichiometric silicon nitride having a thickness of approximately 100 nanometers (nm). It will be clear to one skilled in the art, after reading this Specification, that any substrate suitable for planar processing can be used for handle substrate 206 and any layer comprising an insulating material of any suitable thickness can be used for insulator layer 208 without departing from the scope of the present invention. In some embodiments, handle substrate 206 comprises an electrically insulating material; therefore, inclusion of insulating layer 208 is not necessary.

At operation 302, sacrificial layer 402 is formed on insulator layer 208 and patterned to define standoffs 406. Standoffs 406 provide a separation between insulator layer 208 and comb-drive fingers 218-T of actuator 114, as discussed below. In the depicted example, sacrificial layer 402 comprises sacrificial material 404, which is a silicon oxide. Sacrificial layer 402 is formed with a thickness of approximately one micron. Although sacrificial layer 402 is a layer of silicon oxide having a thickness of approximately one micron, it will be clear to one skilled in the art, after reading this Specification, how to specify, make, and use alternative embodiments of the present invention wherein sacrificial layer 402 includes a different sacrificial material and/or has a different thickness.

FIG. 4A depicts SLM 102 after the formation of sacrificial layer 402.

At operation 303, structural layer 408 is deposited in conformal fashion such that it fills the gaps between standoffs 406 and forms a substantially solid layer of structural material 410. In the depicted example, structural material 410 comprises a polysilicon and structural layer 408 has a total thickness, t1, of approximately two microns.

After its formation, structural layer 408 is thinned via a chemical-mechanical polish (CMP) such that the thickness, t2, of structural material 410 that remains above standoffs 406 is approximately one micron.

FIG. 4B depicts SLM 102 after structural layer 408 has been thinned via CMP.

At operation 304, structural layer 408 is patterned via conventional photolithography and deep-reactive-ion etching (DRIE) to define comb fingers 218-T and nascent comb fingers 412.

FIG. 4C depicts SLM 102 after the formation of comb fingers 218-T and nascent comb fingers 412.

At operation 305, protective layer 414 is formed on all exposed surfaces of comb fingers 218-T and 412. In the depicted example, protective layer 414 is a thin layer of silicon dioxide formed via conventional oxidation. The thickness of protective layer 414 is established such that the layer is sufficient to protect comb fingers 218-T and the sidewalls of nascent comb fingers 412 from attack during subsequent thinning of the nascent comb fingers.

At operation 306, protective layer 414 is removed from top surfaces 416 of each of nascent comb fingers 412, while leaving it in place on the top of comb fingers 218-T.

FIG. 4D depicts SLM 102 after the formation and patterning of protective layer 414.

At operation 307, the height of nascent comb fingers 412 is reduced by selectively etching them from the top, which defines the final form of comb fingers 218-B. Typically, operation 307 is performed via reactive-ion etching (RIE) using an etchant that etches structural material 410 substantially preferentially over sacrificial material 404. In the depicted example, comb fingers 218-B have a final height, h2, of approximately one micron; however, other heights are possible without departing from the scope of the present invention.

Figure 4E:
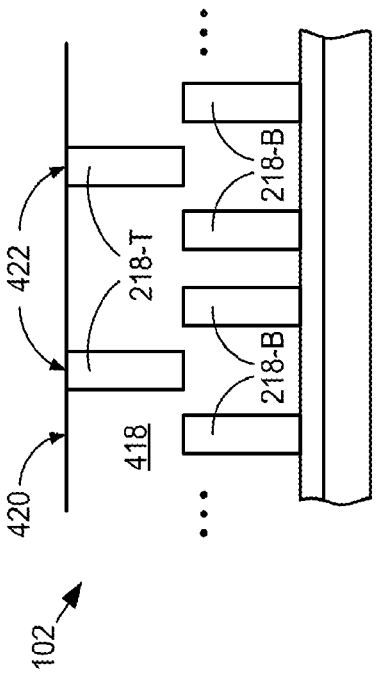

FIG. 4E depicts SLM 102 after the final definition of comb fingers 218-B.

At operation 308, protective layer 414 is removed.

At operation 309, refill layer 418 is deposited to completely fill the regions between electrodes 216 and form surface 420, which is substantially coplanar with top surfaces 422 of comb fingers 218-T. In the depicted example, refill layer 418 comprises sacrificial material 404; therefore, refill layer 418 incorporates standoffs 406. It should be noted, however, that other sacrificial materials can be used in refill layer 418 without departing from the scope of the present invention. Typically, refill layer 418 is formed such that it projects above the top surface of comb fingers 218-T and subsequently thinned using CMP to planarize surface 420 and top surfaces 422, thereby forming a composite smooth flat surface in preparation for the subsequent deposition of structural layer 424.

Figure 4G:
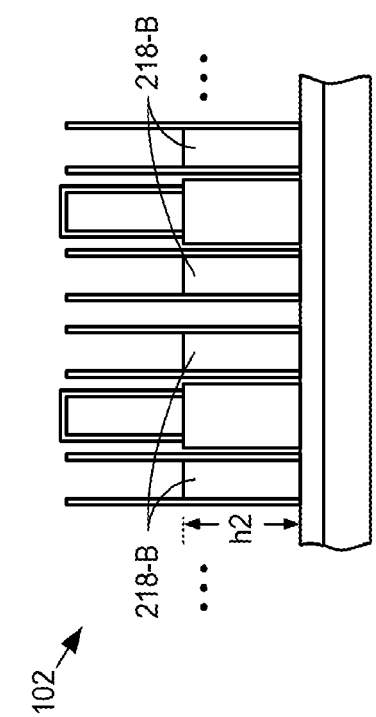
Figure 4F:
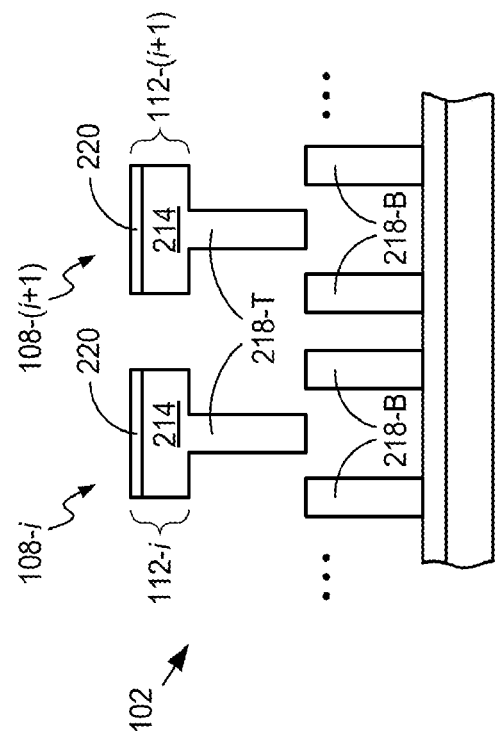

FIG. 4F depicts SLM 102 after the formation of refill layer 418.

At operation 310, plates 214 are defined on surface 420 and top surfaces 422. Plates 214 are defined by first depositing structural layer 424 on surface 420 to a thickness, t3. In the depicted example, t3 is approximately 300 nm; however, any suitable thickness can be used for structural layer 424 without departing from the scope of the present invention. Structural layer 424 comprises structural material 410 and has a thickness of approximately 400 nm. It should be noted, however, that structural layer 424 can include any suitable structural material and have any suitable thickness without departing from the scope of the present invention. Structural layer 424 is then patterned in conventional fashion to define plates 214. It should be noted that anchors 202 and tethers 204, as well as, in some embodiments, electrical traces for electrically interconnecting each of mirror elements 108 to controller 104 are also defined in operation 312; however, for clarity, these elements are not shown in the figures.

It is an aspect of the present invention that each of plates 214 is formed such that its width, w1, is equal to or greater than the width, w2, of its respective actuator 114. In other words, actuator 114 resides completely underneath micromirror 112, in the array direction of SLM 102 (i.e., as depicted, the x-direction), when mirror element 108 is fully formed.

FIG. 4G depicts SLM 102 after the formation of plates 214.

At operation 311, all sacrificial material in standoffs 406 and refill layer 418 is removed, thereby making mirror elements 108 mechanically active (i.e., enabling their motion relative to substrate 110).

At optional operation 312, reflectors 220 are formed on plates 214 to collectively define and improve the reflectivity of micromirrors 112. Typically, reflectors 220 are formed via a blanket deposition of a thin layer (e.g., 200 nm) of a highly reflective metal, such as gold. In some embodiments, polysilicon "gutters" are included to block metal deposition in the regions between electrical traces and bonding pads.

Figure 4H:
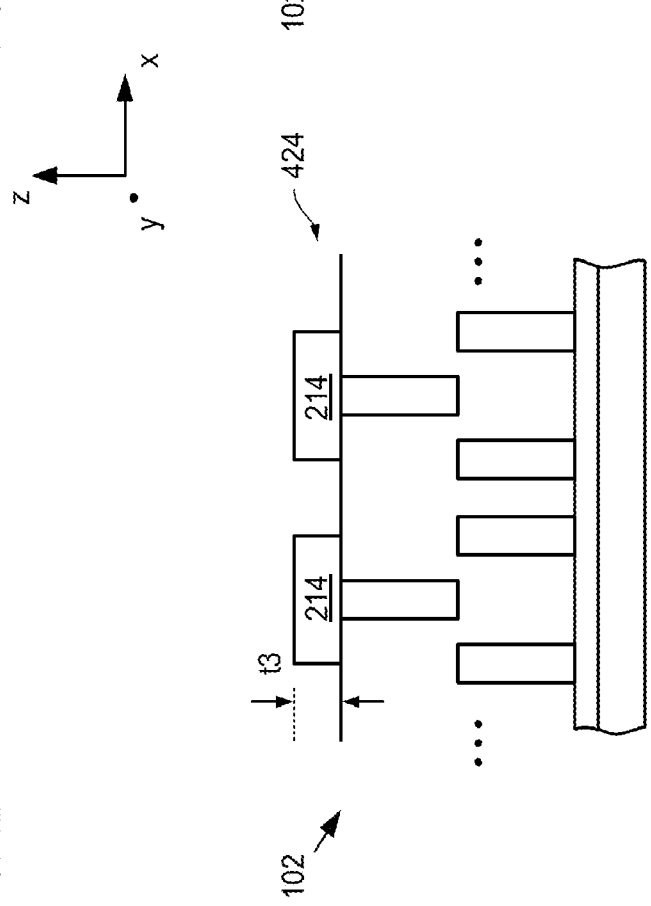

FIG. 4H depicts SLM 102 after the deposition of reflectors 220.

Figure 5A:
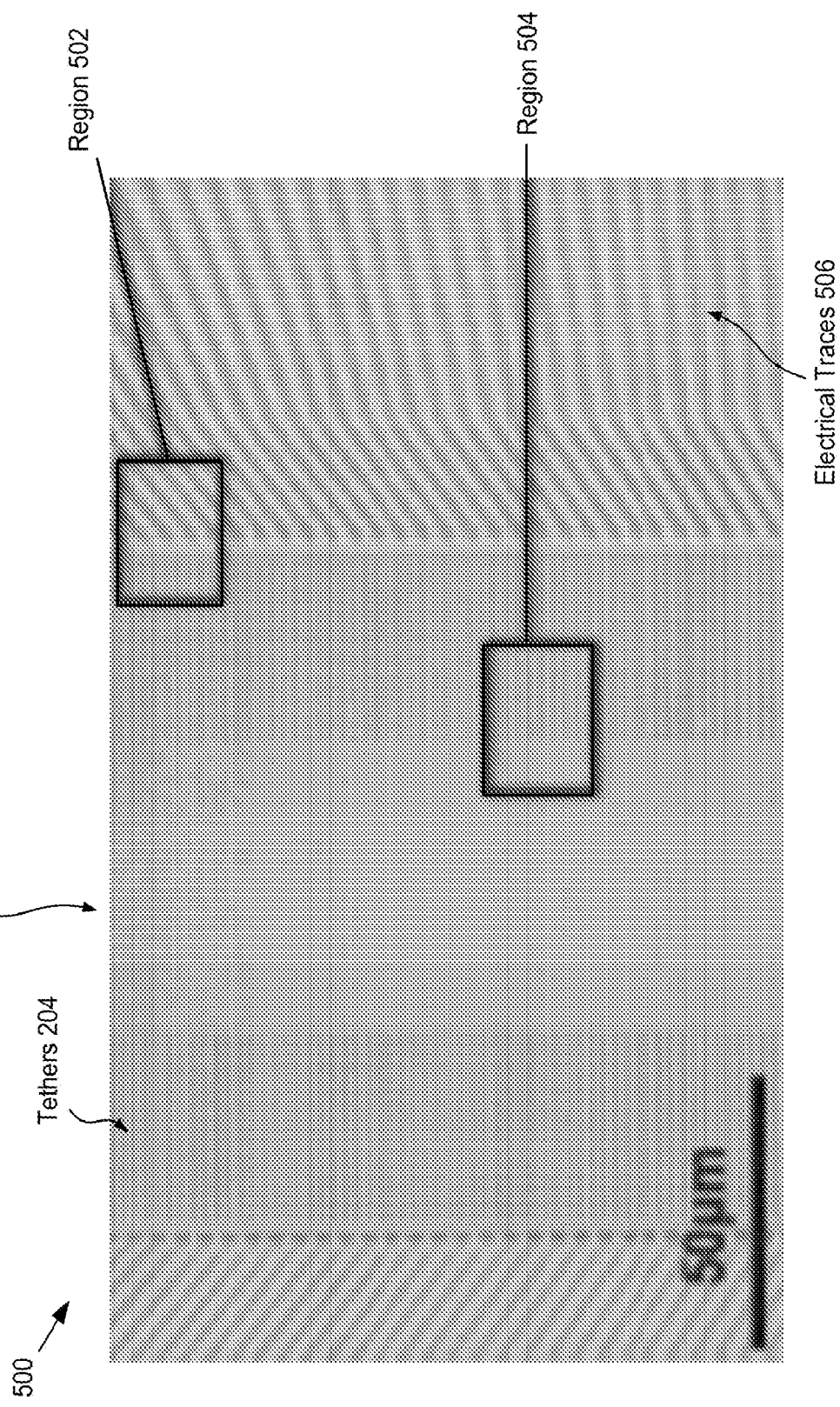
FIG. 5A depicts a scanning-electron microscope image of a portion of a fully formed spatial-light modulator in accordance with the illustrative embodiment.

FIG. 5A depicts a scanning-electron microscope image of a portion of a fully formed spatial-light modulator in accordance with the illustrative embodiment. Image 500 shows a plurality of micromirrors 112 and their respective electrical traces 506, which are electrically coupled with comb fingers 218-T through tethers 204 and micromirrors 112.

Figures 5B, 5C:
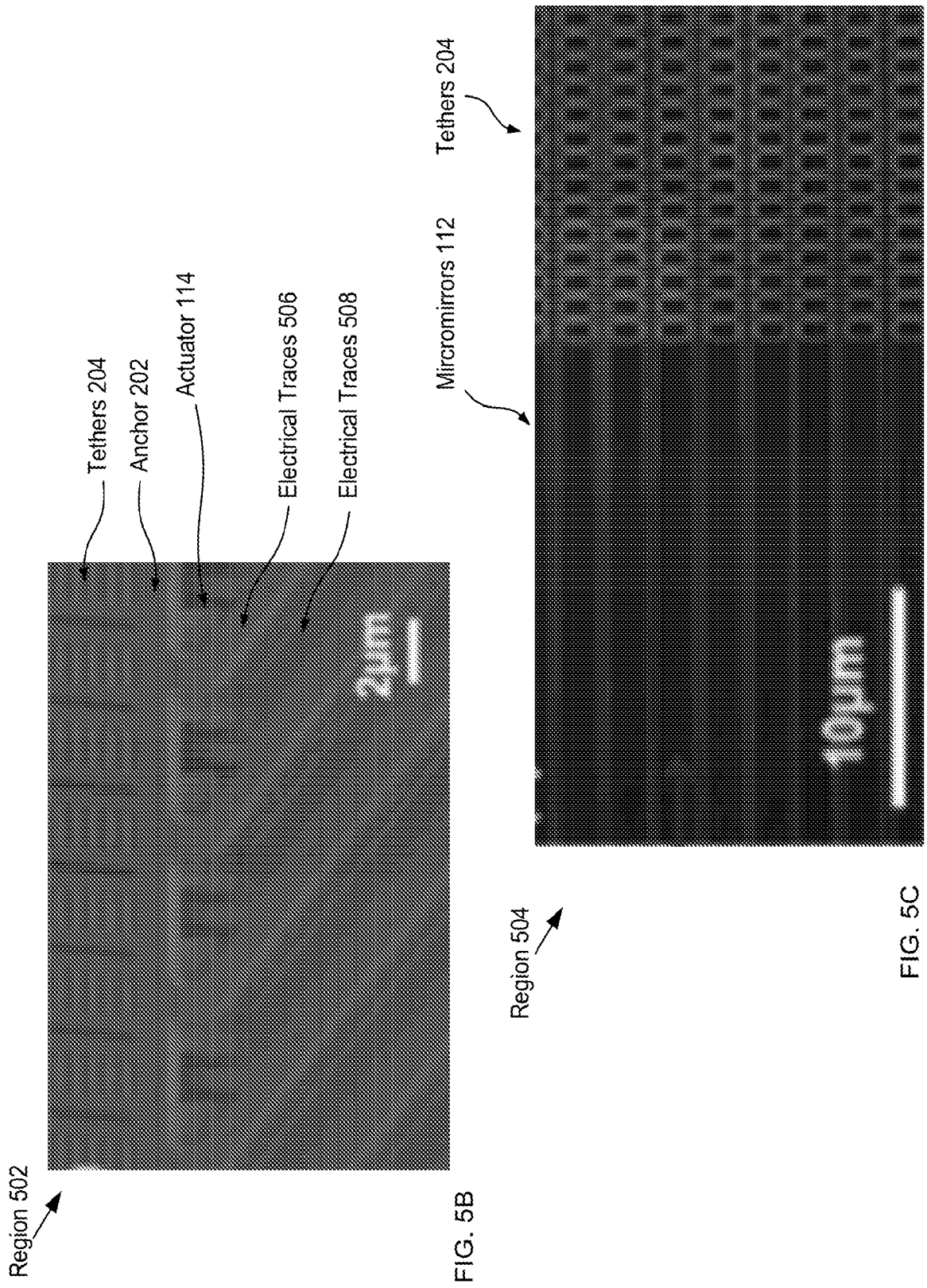
FIG. 5B depicts an enlarged perspective view of region 502. Region 502 includes a portion of a plurality of tethers 204, as well as a plurality of actuators 114 and their respective electrical traces 506 and 508.
FIG. 5C depicts an enlarged top view of region 504, which shows a plurality of micromirrors 112 and portions of their associated tethers 204.

FIG. 5B depicts an enlarged perspective view of region 502. Region 502 includes a portion of a plurality of tethers 204, as well as a plurality of actuators 114 and their respective electrical traces 506 and 508. As can be seen in the image, traces 506 are connected to tethers 204 through anchors 202, which provide a common electrical connection to all of the tethers. In the depicted example, all of micromirrors 112 (and their respective comb fingers 218-T) are held at ground, while comb fingers 218-B of each of actuators 114 receives an independently controllable voltage via a different electrical trace 508. In some embodiments, the voltage applied to comb fingers 218-T are controlled while all of the comb fingers 218-B are held at a common ground potential.

FIG. 5C depicts an enlarged top view of region 504, which shows a plurality of micromirrors 112 and portions of their associated tethers 204.

Although a one-dimensional SLM is attractive for use in many applications, in some cases, a two-dimensional SLM is required. It is another aspect of the present invention that the footprint of a mirror element can be made small enough to enable a two-dimensional array arrangement by locating its tethers underneath its micromirror. It should be noted that such a "buried-tether" configuration is also suitable for use in a one-dimensional array.

Figure 6:
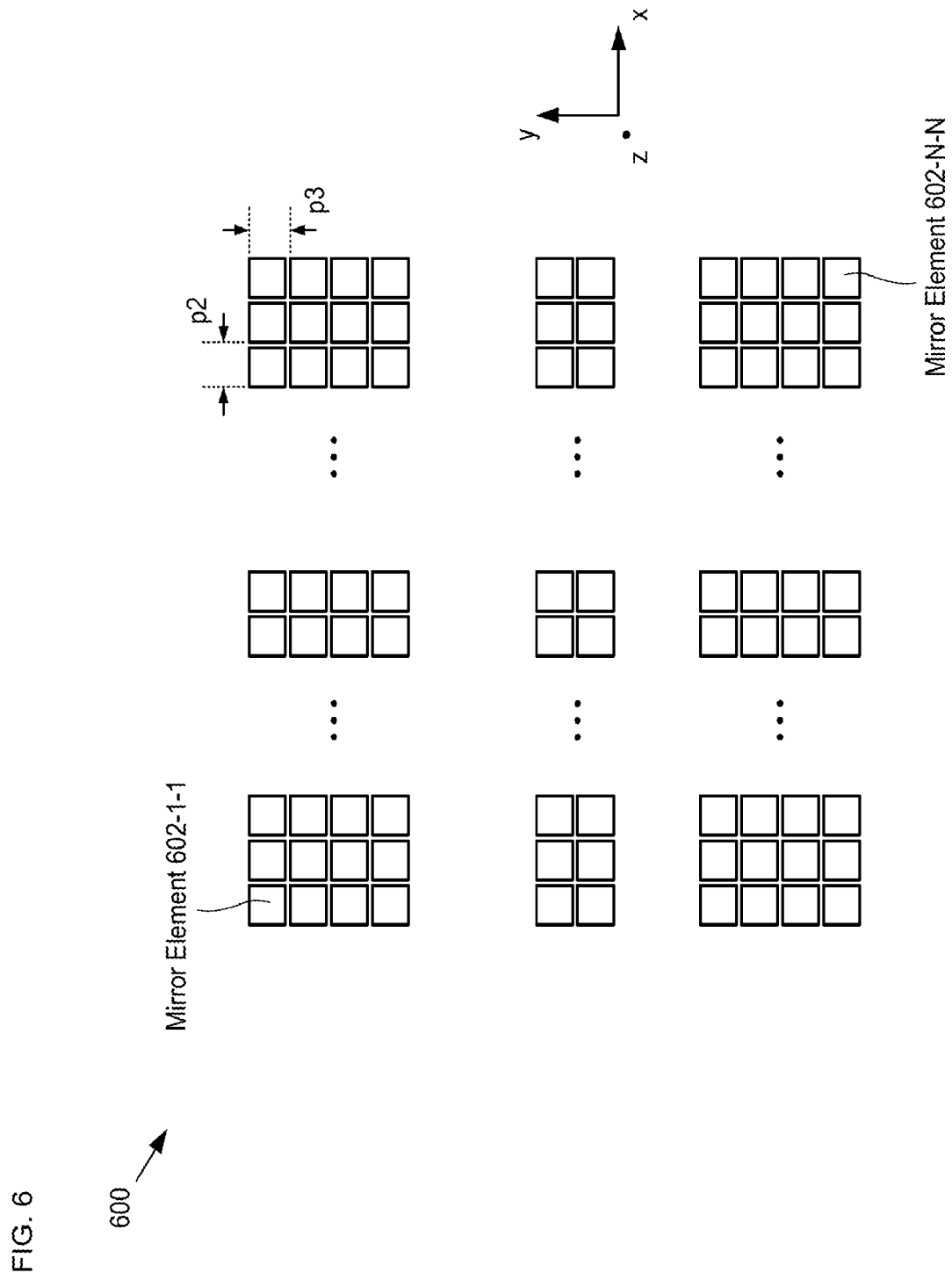
FIG. 6 depicts a schematic drawing of a top view of an SLM in accordance with a first alternative embodiment of the present invention.

FIG. 6 depicts a schematic drawing of a top view of an SLM in accordance with a first alternative embodiment of the present invention. SLM 600 includes mirror elements 602-1-1 through 602-N-N, which are arranged in a square two-dimensional array. In the depicted example, SLM 600 has a pitch, p2, in the x-direction and pitch, p3, in the y-direction, where each of pitch p2 and p3 is approximately 2.4 micron. In some embodiments, SLM 600 includes a two-dimensional array of mirror elements that has a different number of elements in the x- and y-dimensions. In some embodiments, at least one of pitch p2 and p3 is other than 2.4 micron.

Figure 7A:
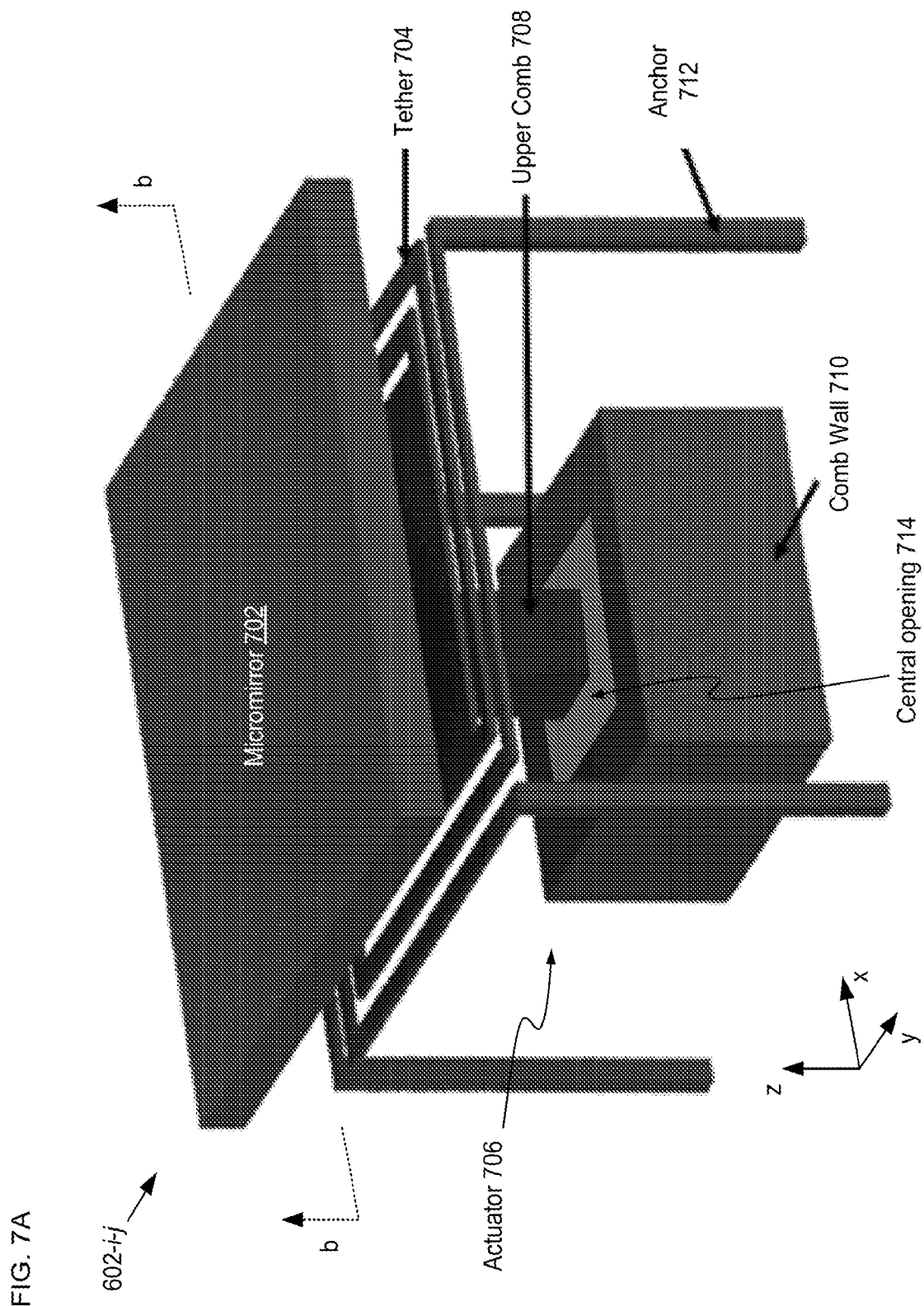

FIGS. 7A-B depict schematic drawings of perspective and cross-section views of a mirror element in accordance with a first alternative embodiment of the present invention. The cross-section view shown in FIG. 7B is taken through line b-b shown in FIG. 7A. Mirror element 602-$i$-$j$ (where $1 \leq i \leq N$ and $1 \leq j \leq N$) is representative of each of mirror elements 602-1-1 through 602-N-N (referred to, collectively, as mirror elements 602), each of which includes micromirror 702, tethers 704, and actuator 706.

Micromirror 702 is analogous to micromirror 112 described above; however, micromirror 702 has a substantially square cross-section having sides of approximately 2.1 micron. In some embodiments, micromirror 702 has a cross-sectional shape other than square, such as round, rectangular, irregular, and the like.

Tethers 704 are "folded" spring elements that facilitate motion of micromirror 702 in the z-direction while substantially limiting lateral motion of the micromirror (i.e., motion within the x-y plane). In some embodiments, at least one of tethers 704 has a different configuration, such as serpentine, simple beam, etc.

Actuator 706 is analogous to actuator 114 described above; however, actuator 706 includes a single "pencil-shaped" electrode 708 (referred to as a pencil comb finger 708) and annular electrode 710 (referred to as a comb wall 710) having central opening 714. Pencil comb finger 708 is mechanically coupled with micromirror and comb wall 710 is affixed to substrate 110.

For the purposes of this Specification, including the appended claims:

the term "pencil comb finger" is defined as an electrode that has a cross-section having a columnar shape whose cross-section is substantially square or circular; and the term "comb wall" is defined as an electrode that forms at least part of an annulus having a central opening. The term comb wall is meant to include electrodes that are not continuous annuli, include parallel walls that are not direction connected (except through the substrate on which they reside), have three walls, and have annular shapes such as rectangular, circular, elliptical, irregular, etc.

In the depicted example, micromirror 702 is mechanically coupled with tethers 704 through platform 716 via post 718, which are mechanically rigid fixtures formed of suitable structural material (e.g., structural material 410).

Like tethers 204 described above, tethers 704 extend between platform 716 and anchors 712 to hold micromirror 702 above substrate 110.

Actuator 706 includes pencil comb finger 708, which is mechanically affixed to platform 716, and comb wall 710, which is mechanically affixed to substrate 110. In analogous fashion to SLM 102 described above, it is an aspect of the present invention that the lateral extent of actuator 706 is completely underneath micromirror 702. In other words, the width, w3, of micromirror 702 is equal to or greater than the width, w4, of actuator 706 in every lateral dimension. In order to substantially maximize fill-factor, the lateral extent of micromirror 702 is preferably equal to or greater than the combined lateral extent of actuator 706, tethers 704, and anchors 712.

When a voltage is applied between pencil comb finger 708 and comb wall 710, an electrostatic force is generated that draws pencil comb finger 708 toward substrate 110 and into central opening 714. As a result, platform 716 (and attached micromirror 702) are drawn toward the substrate as well, thereby giving rise to a force on micromirror 702 that is directed toward substrate 110. This force changes the height of the micromirror in the z-direction in the same manner as described above and with respect to mirror element 108.

In the depicted example, all pencil comb fingers 708 are held at a common ground while the voltage applied to each of comb walls 710-1-1 through 710-N-N is individually controlled. In some embodiments, the comb walls are all held at ground potential while the voltage applied to each pencil comb finger is individually controlled.

In some embodiments, comb wall 710 is affixed to platform 716 and pencil comb finger 708 is affixed to substrate 110.

It is to be understood that the disclosure teaches only some examples of embodiments in accordance with the present invention and that many variations of the invention can easily be devised by those skilled in the art after reading this disclosure and that the scope of the present invention is to be determined by the following claims.

What is claimed is:

1. An apparatus comprising a spatial light modulator (102) that includes:
    a substrate (110); and
    a plurality of mirror elements (108) disposed on the substrate, wherein each mirror element of the plurality thereof comprises:
        a micromirror (112) having a first surface (222) that is reflective for input light (116);
        a tether (204 or 704) that supports the micromirror above the substrate, wherein the tether is dimensioned and arranged to enable motion of the micromirror along a first direction that is aligned with a normal axis (120) to the substrate; and
        an actuator (114) that is operative for controlling the height (h1) of the first surface above the substrate;
    wherein the plurality of mirror elements is arranged in a first arrangement that is periodic in a first dimension with a first pitch (p1) that is less than or equal to 3 microns.

2. The apparatus of claim 1 wherein, for each mirror element, the actuator resides completely under the micromirror in the first dimension.

3. The apparatus of claim 1 wherein the plurality of micromirrors is formed such that the spatial light modulator has a fill factor in the first dimension that is equal to or greater than 80%.

4. The apparatus of claim 1 wherein the first arrangement is periodic in a second dimension with a second pitch (p3), and wherein the second pitch is less than or equal to 3 microns.

5. The apparatus of claim 4 wherein the plurality of micromirrors is formed such that the spatial light modulator has a fill factor that is equal to or greater than 80% in each of the first and second dimensions.

6. The apparatus of claim 4 wherein the first pitch and the second pitch are substantially equal.

7. The apparatus of claim 4 wherein, for each mirror element, the actuator resides completely under the micromirror in each of the first and second dimensions.

8. The apparatus of claim 1 wherein at least one actuator of the plurality thereof is a vertical comb-drive actuator comprising:
    a first electrode (218-T) that is mechanically coupled with the micromirror; and
    a second electrode (218-B) that is mechanically coupled with the substrate;
    wherein the first and second electrodes are arranged such that a voltage potential between them gives rise to a force on the micromirror that is directed toward the substrate.

9. The apparatus of claim 1 wherein at least one actuator of the plurality thereof is a vertical comb-drive actuator comprising:
    a first electrode (708) that is a pencil comb finger, the first electrode being mechanically coupled with one of the micromirror and the substrate; and
    a second electrode (710) that is mechanically coupled with the other one of the micromirror and the substrate, the second electrode being a comb wall comprising a central opening (714);
    wherein the first and second electrodes are dimensioned and arranged such that a voltage potential between them gives rise to a force on the micromirror that is directed toward the substrate.

10. The apparatus of claim 1 wherein, for each micromirror of the plurality thereof, the tether (704) resides completely between the micromirror (702) and the substrate.

11. A method for forming a spatial light modulator (102), the method comprising:
    forming a plurality of actuators (114) on a substrate (110), each actuator having a first width (w2) in a first dimension;
    forming a plurality of micromirrors (112), each micromirror having a first surface (222) and a second width (w1) in the first dimension, wherein the plurality of micromirrors is formed such each first surface is movable relative to the substrate, and wherein the plurality of micromirrors are arranged in a first arrangement that is periodic in the first dimension with a first period (p1) that is less than or equal to 3 microns; and
    forming a plurality of tethers (204 or 704) for holding the plurality of micromirrors (702) above the substrate, wherein at least one tether of the plurality thereof is operatively coupled with a different micromirror of the plurality thereof, and wherein each tether of the plurality thereof is dimensioned and arranged to enable motion of its respective micromirror along a first direction that is aligned with a normal axis (120) to the substrate;

wherein each of the plurality of actuators is operatively coupled with a different micromirror of the plurality thereof such that the actuator is operative for controlling the height (h1) of its respective first surface above the substrate based on a control signal (106); and wherein the second width is equal to or greater than the first width and each actuator of the plurality thereof resides completely beneath its respective micromirror in the first dimension.

12. The method of claim 11 wherein the plurality of actuators is formed by operations comprising:

providing a plurality of standoffs (406) disposed on a substrate (110), each standoff of the plurality thereof comprising a first material (404);

forming a first layer (408) of structural material (410) such that the structural material resides between the standoffs of the plurality thereof and has a first thickness (t1);

patterning the first layer to define a first plurality of electrodes (218-T) and a first plurality of nascent electrodes (412);

providing a protective layer (414) on each of first plurality of electrodes and the first plurality of nascent electrodes;

removing the protective layer from the top surface (416) of each of the first plurality of nascent electrodes; and forming a second plurality of electrodes (218-B) by thinning each of the plurality of nascent electrodes such that it has height (h2).

13. The method of claim 12 wherein the plurality of micromirrors is formed by operations comprising:

forming a refill layer (418) having a first surface (420), wherein the first surface is substantially coplanar with a top surface (422) of each of the first plurality of electrodes;

forming a second layer (424) of structural material (410) such that the second layer is in direct physical contact with each top surface of the first plurality of electrodes; and patterning the second layer to define a plurality of plates (214) having the second width, wherein each plate is physically connected with at least one electrode of the first plurality thereof.

14. The method of claim 13 further comprising forming a reflector (220) on each plate of the plurality thereof.

15. The method of claim 13 wherein the plurality of micromirrors is formed such that the spatial light modulator has a fill factor in the first dimension that is equal to or greater than 80%.

16. The method of claim 11 wherein the plurality of micromirrors is formed such that the first arrangement is periodic in a second dimension with a second period (p3) that is less than or equal to 3 microns, and wherein each actuator of the plurality thereof resides completely beneath its respective micromirror in the second dimension.

17. The method of claim 16 wherein the plurality of micromirrors is formed such that the spatial light modulator has a fill factor that is equal to or greater than 80% in each of the first and second dimensions.

18. The method of claim 11 wherein each of the plurality of tethers resides completely beneath its respective micromirror.

19. The method of claim 11 wherein at least one of the plurality of actuators is formed such that it includes a first electrode that is physically coupled with its respective micromirror and a second electrode that is affixed to the substrate, and wherein the first and second electrodes are dimensioned and arranged such that a voltage potential between the first and second electrodes gives rise to a force on the micromirror that is directed toward the substrate.

20. The method of claim 19 wherein one of the first electrode and second electrode is a pencil comb finger (708) and the other one of the first electrode and second electrode is a comb wall (710) comprising a central opening (714).

* * * * *